(12) United States Patent
Pointcheval et al.

(10) Patent No.: US 11,483,142 B2
(45) Date of Patent: Oct. 25, 2022

(54) KEY AGREEMENT SYSTEM, METHOD, AND APPARATUS

(71) Applicant: Huawei International Pte. Ltd., Singapore (SG)

(72) Inventors: David Pointcheval, Thiais (FR); Guilin Wang, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 0 days.

(21) Appl. No.: 17/107,218

(22) Filed: Nov. 30, 2020

(65) Prior Publication Data

US 2021/0083862 A1    Mar. 18, 2021

Related U.S. Application Data

(63) Continuation of application No. PCT/SG2018/050266, filed on May 30, 2018.

(51) Int. Cl.
| | | |
|---|---|---|
| *H04L 9/08* | (2006.01) | |
| *H04L 9/06* | (2006.01) | |
| *H04L 9/30* | (2006.01) | |

(52) U.S. Cl.
CPC .......... *H04L 9/0838* (2013.01); *H04L 9/0618* (2013.01); *H04L 9/0861* (2013.01); *H04L 9/0891* (2013.01); *H04L 9/3073* (2013.01)

(58) Field of Classification Search
CPC .................................................... H04L 9/0838
See application file for complete search history.

(56) References Cited

U.S. PATENT DOCUMENTS

| | | | |
|---|---|---|---|
| 9,246,675 B2 | 1/2016 | Ding | |
| 2006/0280308 A1* | 12/2006 | Anshel | A61M 1/14 380/46 |

(Continued)

FOREIGN PATENT DOCUMENTS

| | | |
|---|---|---|
| CN | 104980928 A | 10/2015 |
| CN | 106603485 A | 4/2017 |
| CN | 107948189 A | 4/2018 |

OTHER PUBLICATIONS

Zhang et al.,"Authenticated Key Exchange from Ideal Lattices," Proceedings of Advances in Cryptology, Eurocrypt 2015, LNCS 9057, Springer, total 38 pages (2015).

(Continued)

*Primary Examiner* — Bradley W Holder
(74) *Attorney, Agent, or Firm* — Leydig, Voit & Mayer, Ltd.

(57) ABSTRACT

A key agreement system, method, and apparatus are provided. The method includes: generating, by a first device, a private-public key pair, sending a public key in the private-public key pair to a second device, and receiving a ciphertext and a commitment value; obtaining, by the first device, a first result, obtaining an original key based on a private key in the private-public key pair and the ciphertext, determining a second bit string based on some bits in the original key, calculating a second result based on the second bit string and the first result, and sending the second result to the second device; and receiving, by the first device, an opening value, performing authentication on the second device based on the opening value and the commitment value to obtain an authentication result, and generating a session key used to communicate with the second device.

20 Claims, 8 Drawing Sheets

(56) References Cited

U.S. PATENT DOCUMENTS

| | | | |
|---|---|---|---|
| 2010/0017602 A1 | 1/2010 | Bussard et al. | |
| 2010/0153728 A1* | 6/2010 | Brown | H04L 9/3066 713/171 |
| 2014/0223182 A1* | 8/2014 | Avanzi | H04L 9/3271 713/168 |
| 2015/0067336 A1 | 3/2015 | Ding | |
| 2015/0295713 A1* | 10/2015 | Oxford | H04L 9/3242 713/171 |

OTHER PUBLICATIONS

Bos et al.,"Crystals—Kyber: a CCA-secure module-lattice-based KEM," Cryptology ePrint Archive, total 14 pages (2017).

Bellovin et al.,"Encrypted Key Exchange: Password-Based Protocols Secure Against Dictionary Attacks," In: Proceedings of 1992 IEEE Symposium on Security and Privacy, pp. 72-84, IEEE Computer Society Press, total 13 pages (1992).

Shoup, "FCD 18033-2 Encryption algorithms—Part 2: Asymmetric ciphers," total 131 pages (Dec. 6, 2004).

Abdalla et al.,"Simple Password-Based Encrypted key exchange protocols," In: Proceedings of CT-RSA 2005, LNCS 3376, pp. 191-208, Springer (2005).

Del Pino et al.,"The Whole is Less than the Sum of its Parts: Constructing More Efficient Lattice-Based AKEs," In: Proceedings of Security and Cryptography for Networks (SCN 2016), LNCS 9841, total 29 pages (2016).

Pointcheval et al.,"VTBPEKE: Verifier-based Two-Basis Password Exponential Key Exchange", In Proceedings of the 2017 ACM on Asia Conference on Computer and Communications Security (ASIACCS ' 2017), pp. 301-312, ACM Press (Apr. 2017).

Fujioka et al., "Practical and Post-Quantum Authenticated Key Exchange from One-Way Secure Key Encapsulation Mechanism," Asia CCS'13: Proceedings of the 8th ACM SIGSAC symposium on Information, computer and communications security, Hangzhou, China, pp. 83-94, ACM (May 8-10, 2013).

Fujioka et al., "Strongly secure authenticated key exchange from factoring, codes, and lattices," Designs, Codes and Cryptography, vol. 76, No. 3, Total 36 pages, Springer Science+Business Media New York (Apr. 23, 2014).

* cited by examiner

| $q$ | $\tau$ | |
|---|---|---|
| | Golay code | Hamming + RS |
| 512 | 0.0029 | 0.0063 |
| 1024 | 0.0021 | 0.0044 |
| 2048 | 0.0015 | 0.0031 |
| 4096 | 0.0011 | 0.0022 |
| 8192 | 0.00074 | 0.0016 |

FIG. 4

KEY AGREEMENT SYSTEM, METHOD, AND APPARATUS

CROSS-REFERENCE TO RELATED APPLICATIONS

This application is a continuation of International Application No. PCT/SG2018/050266, filed on May 30, 2008, the disclosure of which is hereby incorporated by reference in its entirety.

TECHNICAL FIELD

Embodiments of this application relate to the field of quantum secure technologies, and in particular, to a key agreement system, method, and apparatus.

BACKGROUND

Key agreement, or more precisely, authenticated key exchange (AKE), enables two communication bodies to securely agree on a common session key for subsequent secure communication.

In conventional AKE protocols, a private-public key pair, a password, and the like are used as materials for key agreement and authentication, and both communication parties agree on a common secure session key over a public insecure channel. However, these protocols, such as an encrypted key exchange (EKE) protocol, a simple password-based encrypted key exchange (SPAKE) protocol, and a verifier-based two-basis password exponential key exchange (VTBPEKE) protocol, are essentially based on a Diffie-Hellman (DH) key exchange technology. The DH key exchange technology is based on a discrete logarithm problem, and the problem has been proved decipherable. Therefore, the DH key exchange technology is no longer secure in quantum computing.

By contrast, existing quantum secure protocols AKEs are complex and inefficient. For example, in a Kyber protocol, both communication parties need to perform a total of six key encapsulation mechanism (KEM) encryption and decryption operations. Although other researchers propose a quantum protocol for optimizing system parameters, both communication parties still need to perform a total of two KEM encryption and decryption operations and four digital signature-related operations.

It can be learned from the foregoing that the existing quantum secure protocols AKEs are complex and inefficient.

SUMMARY

Embodiments of this application provides a key agreement system, method, and apparatus, to implement simple and efficient quantum secure key agreement.

According to a first aspect, an embodiment of this application provides a key agreement system including a first device and a second device.

The first device is configured to: generate a private-public key pair by using a key generation algorithm, and send a public key in the private-public key pair to the second device. The second device is configured to: select an original key based on the received public key by using an encapsulation algorithm, obtain a ciphertext based on the public key and the original key by using the encapsulation algorithm, obtain a commitment value and an opening value based on a first bit string and a random number by using a commitment algorithm, and send the ciphertext and the commitment value to the first device, where the first bit string is a random bit string; and determine a second bit string based on some bits in the original key, and calculate a first result based on the first bit string and the second bit string. The first device is further configured to: obtain the original key based on a private key in the private-public key pair and the received ciphertext by using a decapsulation algorithm, determine the second bit string based on the some bits in the original key, calculate a second result based on the second bit string and the first result, and send the second result to the second device. The second device is further configured to: when the first bit string is the same as the received second result, send the opening value to the first device and generate a session key used to communicate with the first device. That the first bit string is the same as the second result indicates that the second device successfully authenticates the first device. The first device is further configured to authenticate the second device based on the received opening value and commitment value, to obtain an authentication result, where the authentication result is used to indicate that the first device successfully authenticates the second device, and generates a session key used to communicate with the second device.

Therefore, according to the system provided in the embodiments of this application, only one temporary KEM public key pair is generated and used during agreement, and both communication parties perform a total of two KEM encryption and decryption operations, and perform some simple commitment operations. Compared with a Kyber protocol and a quantum protocol with optimized system parameters in the prior art, the solution of this application has efficiency significantly improved while security is ensured to some extent. In addition, the solution of this application is easy to implement.

In a possible design, the second device is specifically configured to calculate the first bit string and the second result by using a first algorithm, to obtain the first result; and the first device is specifically configured to calculate the second bit string and the first result by using the first algorithm, to obtain the second result. The first algorithm is any one of an exclusive OR operation, a modulo addition operation, a modulo subtraction operation, or a modulo multiplication operation, or a combination thereof.

Therefore, the second device may calculate the first result by using various possible algorithms, and the first device may calculate the second by using an algorithm the same as that used for calculating the first result.

In a possible design, the first device is further configured to: delete the private-public key pair after generating the session key used to communicate with the second device; and re-generate a private-public key pair when initiating key agreement again with the second device or initiating key agreement with a third device.

In the prior art, both communication bodies need to store a private-public key pair, a password, and the like as materials for key agreement and authentication. Consequently, a large amount of storage space is occupied. However, in this embodiment of this application, the first device deletes the private-public key pair after generating the session key used to communicate with the second device. In this way, storage space can be saved. The method provided in this embodiment of this application is more applicable to a device with a limited hardware capability.

In a possible design, the second device is further configured to: delete the public key after generating the session key used to communicate with the first device; and generate a private-public key pair when initiating key agreement again with the first device or initiating key agreement with a fourth device.

In the prior art, both communication bodies need to store a private-public key pair, a password, and the like as materials for key agreement and authentication. Consequently, a large amount of storage space is occupied. However, in this embodiment of this application, the second device deletes the public key after generating the session key used to communicate with the first device. In this way, storage space can be saved. The method provided in this embodiment of this application is more applicable to a device with a limited hardware capability.

In a possible design, the first device is specifically configured to generate the session key used to communicate with the second device, based on one or more of the following parameters: an identifier of the first device, an identifier of the second device, the public key, the ciphertext, the commitment value, the opening value, the original key, or the second result.

The second device is specifically configured to generate, based on the one or more parameters, the session key used to communicate with the first device, where the session key used to communicate with the second device is the same as the session key used to communicate with the first device Therefore, the session key may be generated by using various function forms and a combination of various parameters, and implementation is flexible and convenient.

According to a second aspect, an embodiment of this application provides a key agreement method, including:

A first device generates a private-public key pair by using a key generation algorithm, and sends a public key in the private-public key pair to a second device. The first device receives a ciphertext and a commitment value, where the ciphertext is obtained based on the public key and an original key by using an encapsulation algorithm, the original key is selected based on the public key by using the encapsulation algorithm, and the commitment value is obtained based on a first bit string and a random number by using a commitment algorithm, where the first bit string is a random bit string. The first device obtains a first result, where the first result is calculated based on the first bit string and a second bit string, and the second bit string is determined based on some bits in the original key. The first device obtains the original key based on a private key in the private-public key pair and the ciphertext by using a decapsulation algorithm, and determines the second bit string based on the some bits in the original key. The first device calculates a second result based on the second bit string and the first result, and sends the second result to the second device. The first device receives an opening value, where the opening value is sent by the second device to the first device when the first bit string is the same as the second result, and the opening value is obtained based on the first bit string and the random number by using the commitment algorithm. The first device attempts to authenticate the second device based on the opening value and the commitment value, to obtain an authentication result, where the authentication result is used to indicate that the second device successfully authenticates the second device, and generates a session key used to communicate with the second device.

Therefore, according to the method provided in the embodiments of this application, only one temporary KEM public key pair is generated and used during agreement, and both communication parties perform a total of two KEM encryption and decryption operations, and perform some simple commitment operations. Compared with a Kyber protocol and a quantum protocol with optimized system parameters in the prior art, the solution of this application has efficiency significantly improved while security is ensured to some extent. In addition, the solution of this application is easy to implement.

In a possible design, when calculating the second result based on the second bit string and the first result, the first device performs calculation based on the second bit string and the first result by using a first algorithm, to obtain the second result, where the first algorithm is any one of an exclusive OR operation, a modulo addition operation, a modulo subtraction operation, or a modulo multiplication operation, or a combination thereof.

Therefore, the first device may calculate the second result by using various possible algorithms.

In a possible design, the first algorithm is the exclusive OR operation.

When performing calculation based on the second bit string and the first result by using the first algorithm, to obtain the second result, the first device performs calculation based on the second bit string and the first result by using an exclusive OR algorithm, to obtain the second result.

Therefore, the first device may perform calculation through the exclusive OR operation to obtain an exclusive OR result, and use the exclusive OR result as the second result.

In a possible design, the first device deletes the private-public key pair after generating the session key used to communicate with the second device; and re-generate a private-public key pair when initiating key agreement again with the second device or initiating key agreement with a third device.

In the prior art, both communication bodies need to store a private-public key pair, a password, and the like as materials for key agreement and authentication. Consequently, a large amount of storage space is occupied. However, in this embodiment of this application, the first device deletes the private-public key pair after generating the session key used to communicate with the second device. In this way, storage space can be saved. The method provided in this embodiment of this application is more applicable to a device with a limited hardware capability.

In a possible design, when generating the session key used to communicate with the second device, the first device generates the session key used to communicate with the second device, based on one or more of the following parameters: an identifier of the first device, an identifier of the second device, the public key, the ciphertext, the commitment value, the opening value, the original key, or the second result. Therefore, the first device may generate the session key by using various function forms and a combination of various parameters, and implementation is flexible and convenient.

According to a third aspect, an embodiment of this application provides a key agreement method, including:

A second device receives a public key, where the public key is a public key in a private-public key pair generated by using a key generation algorithm.

A second device selects an original key based on the public key by using the encapsulation algorithm, obtains a ciphertext based on the public key and the original key by using the encapsulation algorithm, obtains a commitment value and an opening value based on a first bit string and a random number by using a commitment algorithm, and sends the ciphertext and the commitment value to the first device, where the first bit string is a random bit string. The second device determines a second bit string based on some bits in the original key, and calculates a first result based on the first bit string and the second bit string. The second device receives a second result, where the second result is calculated based on the second bit string and the first result. When the first bit string is the same as the second result, the second device sends the opening value to the first device and generates a session key used to communicate with the first device, where that the first bit string is the same as the second result indicates that the second device successfully authenticates the first device.

Therefore, according to the method provided in the embodiments of this application, only one temporary KEM public key pair is generated and used during agreement, and both communication parties perform a total of two KEM encryption and decryption operations, and perform some simple commitment operations. Compared with a Kyber protocol and a quantum protocol with optimized system parameters in the prior art, the solution of this application has efficiency significantly improved while security is ensured to some extent. In addition, the solution of this application is easy to implement.

In a possible design, when calculating the first result based on the first bit string and the second bit string, the second device performs calculation based on the first bit string and the second bit string by using a first algorithm, to obtain the first result, where the first algorithm is any one of an exclusive OR operation, a modulo addition operation, a modulo subtraction operation, or a modulo multiplication operation, or a combination thereof. Therefore, the second device may calculate the first result by using various possible algorithms, and implementation is more flexible and convenient.

In a possible design, the first algorithm is the exclusive OR operation; and when performing calculation based on the first bit string and the second bit string by using the first algorithm, to obtain the first result, the second device performs calculation based on the first bit string and the second bit string through the exclusive OR operation, to obtain the first result.

In a possible design, the second device deletes the public key after generating the session key used to communicate with the first device; and generates a private-public key pair when the initiating key agreement again with the first device, or initiating key agreement with a third device.

In the prior art, both communication bodies need to store a private-public key pair, a password, and the like as materials for key agreement and authentication. Consequently, a large amount of storage space is occupied. However, in this embodiment of this application, the second device deletes the public key after generating the session key used to communicate with the first device. In this way, storage space can be saved. The method provided in this embodiment of this application is more applicable to a device with a limited hardware capability.

In a possible design, when generating the session key used to communicate with the second device, the second device generates the session key used to communicate with the first device, based on one or more of the following parameters: an identifier of the first device, an identifier of the second device, the public key, the ciphertext, the commitment value, the opening value, the original key, or the second result.

In the prior art, both communication bodies need to store a private-public key pair, a password, and the like as materials for key agreement and authentication. Consequently, a large amount of storage space is occupied. However, in this embodiment of this application, the second device deletes the public key after generating the session key used to communicate with the second device. In this way, storage space can be saved. The method provided in this embodiment of this application is more applicable to a device with a limited hardware capability.

According to a fourth aspect, an embodiment of this application provides a key agreement apparatus. The apparatus may be a first device, or may be a chip in a first device. The apparatus may include a processing unit and a transceiver unit. When the apparatus is the first device, the processing unit may be a processor, and the transceiver unit may be a transceiver. The first device may further include a storage unit, and the storage unit may be a memory. The storage unit is configured to store an instruction, and the processing unit executes the instruction stored in the storage unit, to enable the first device to perform the method in the second aspect or any possible design of the second aspect. When the apparatus is the chip in the first device, the processing unit may be a processor, and the transceiver unit may be an input/output interface, a pin, a circuit, or the like. The processing unit executes an instruction stored in a storage unit. The storage unit is configured to store an instruction. The storage unit may be a storage unit (for example, a register or a cache) in the chip. Alternatively, the storage unit may be a storage unit (for example, a read-only memory or a random access memory) located outside the chip but in the first device, so that the first device performs the method in the second aspect or any possible design of the second aspect.

According to a fifth aspect, an embodiment of this application provides a key agreement apparatus. The apparatus may be a second device, or may be a chip in a second device. The apparatus may include a processing unit and a transceiver unit. When the apparatus is the second device, the processing unit may be a processor, and the transceiver unit may be a transceiver. The second device may further include a storage unit, and the storage unit may be a memory. The storage unit is configured to store an instruction, and the processing unit executes the instruction stored in the storage unit, to enable the second device to perform the method in the third aspect or any possible design of the third aspect. When the apparatus is the chip in the second device, the processing unit may be a processor, and the transceiver unit may be an input/output interface, a pin, a circuit, or the like. The processing unit executes an instruction stored in a storage unit. The storage unit is configured to store an instruction. The storage unit may be a storage unit (for example, a register or a cache) in the chip. Alternatively, the storage unit may be a storage unit (for example, a read-only memory or a random access memory) located outside the chip but in the second device, so that the second device performs the method in the third aspect or any possible design of the third aspect.

According to a sixth aspect, an embodiment of this application further provides a computer-readable storage medium, and the computer-readable storage medium stores a computer program. When the computer program is run on a computer, the computer is enabled to perform the method in the first aspect and/or the second aspect.

According to a seventh aspect, an embodiment of this application further provides a computer program product that includes a program. When the computer program product runs on a computer, the computer is enabled to perform the method in the first aspect and/or the second aspect.

BRIEF DESCRIPTION OF DRAWINGS

FIG. 4 is an LPN KEM parameter chart according to an embodiment of this application;

DESCRIPTION OF EMBODIMENTS

The following describes the embodiments of this application with reference to accompanying drawings.

A key agreement method provided in the embodiments of this application may be applied to a scenario in which a hardware capability of a device is limited, for example, an internet of things (IoT) scenario such as a smart home or an internet of vehicles.

A communication body in the embodiments of this application may be a device with a limited hardware capability in one or more aspects such as computing, storage, communication, and energy consumption, and may be specifically any device implemented by hardware, or a program or an application implemented by software, or another body implemented by a combination. In addition, the communication body in this application needs to have a simple input/output port (I/O). Specifically, a device input port may be a simple keyboard or button, or the like; and a device output port may be a simple display, light color, light blinking, or the like.

Figure 1:
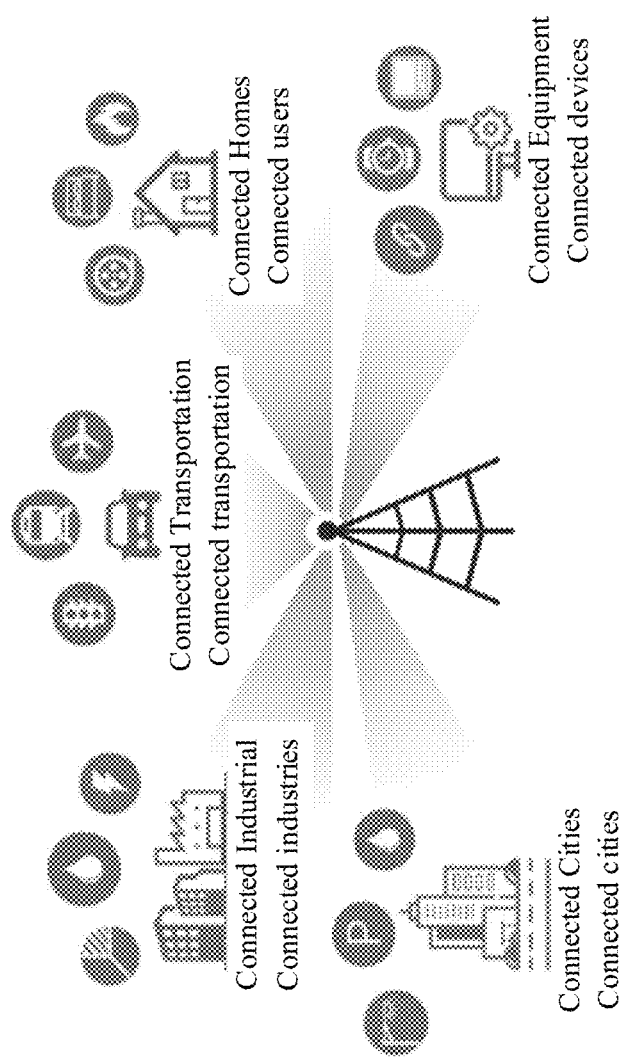
FIG. 1 is a schematic diagram of an IoT application scenario according to an embodiment of this application.

A possible application scenario of this application is an IoT scenario. The IoT is a network intended for machine type communication (MTC). As shown in FIG. 1, the IoT may be used to connect industries, transportation, users, cities, devices, and the like. In the future, the IoT may be mainly applied to fields such as smart metering, medical examination and monitoring, logistics inspection, industrial inspection and monitoring, internet of vehicles, smart communities, and wearable devices. The communication body in this application may be an IoT terminal. For example, the IoT terminal is an electricity meter or a water meter that is usually installed indoors or even in a basement, a sensor that is disposed in the soil to detect soil moisture to implement automatic irrigation, or a detection instrument that a cow wears to monitor a health status of the cow. Therefore, the communication body generally needs to be deployed on a large scale. To reduce costs, hardware configuration of the communication body is usually not high. For example, some IoT terminals are powered by batteries. In this case, to avoid frequent battery replacement during use of the batteries, the IoT terminals need to operate with extremely low power consumption. Therefore, computing and storage capabilities of the IoT terminals are usually not high.

The following first describes two basic password tools required in this application: a KEM and a commitment scheme.

The KEM may include the following three algorithms:

(1) Key generation algorithm KeyGen( ) The algorithm may be run to generate a KEM private-public key pair (sk and pk), where sk represents a private key, and pk represents a public key.

(2) Encapsulation algorithm Encaps(pk): For a specific KEM public key pk, the algorithm is run to output (C, k), where k represents an original key, and C represents a ciphertext obtained after k is encrypted.

(3) Decapsulation algorithm Decaps(sk, C): The algorithm is run to decrypt the ciphertext C and the KEM private key sk, to obtain the original key k.

For more detailed descriptions and security definitions about the KEM, refer to an ISO international standard. Details are not described herein again.

The commitment scheme may include the following two algorithms:

(1) Commitment algorithm Commit(m; r): The algorithm selects a random number r for an input message m, and then the algorithm is run to output (F, t). F represents a commitment value for m, and t represents an opening value for verifying the commitment value.

(2) Opening algorithm Open(F; t): The algorithm may be run to output m. For a given (F, t, m), the algorithm may be used to verify whether the commitment value F is a commitment to the message m with respect to the opening value t.

For more detailed descriptions and security definitions about the commitment scheme, refer to a specific scientific research paper.

In addition, the commitment scheme in this application may alternatively be replaced with a hash algorithm. The hash algorithm refers to a cryptographically secure hash function. For example, H(m, r) may be used to replace the commitment scheme. In other words, m is used as an input message and a random number r is selected, to calculate a commitment value F=H(m, r). In addition, it is set that the opening value t=r. A standardized hash function is available, and therefore project implementation is easier. Further, a hash function may also be used to generate a session key. Different Hash functions may be used, or a same hash function may be used, so as to facilitate project implementation.

Figure 2A:
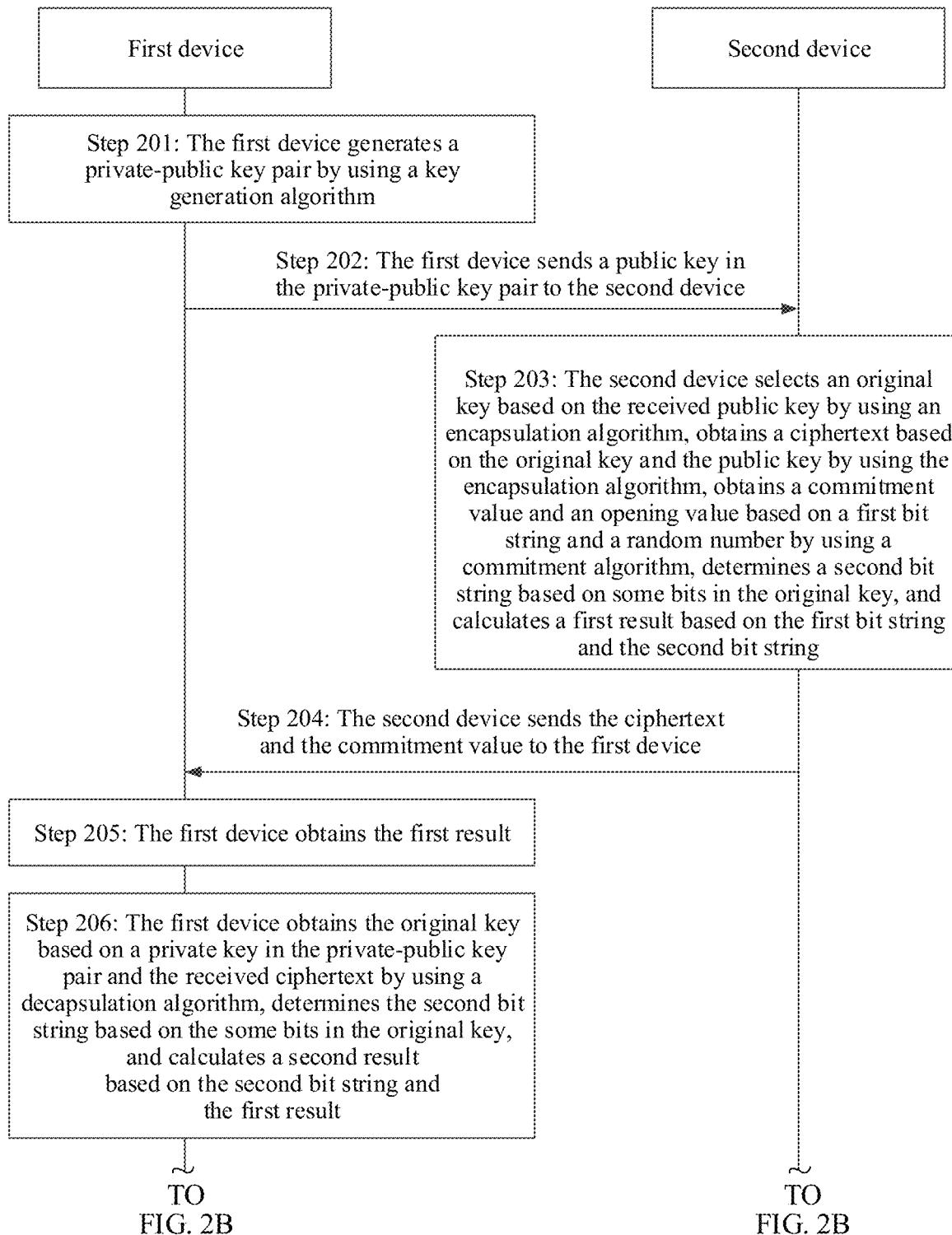
FIG. 2A and FIG. 2B are an overview flowchart of a key agreement method according to an embodiment of this application.
Figure 2B:
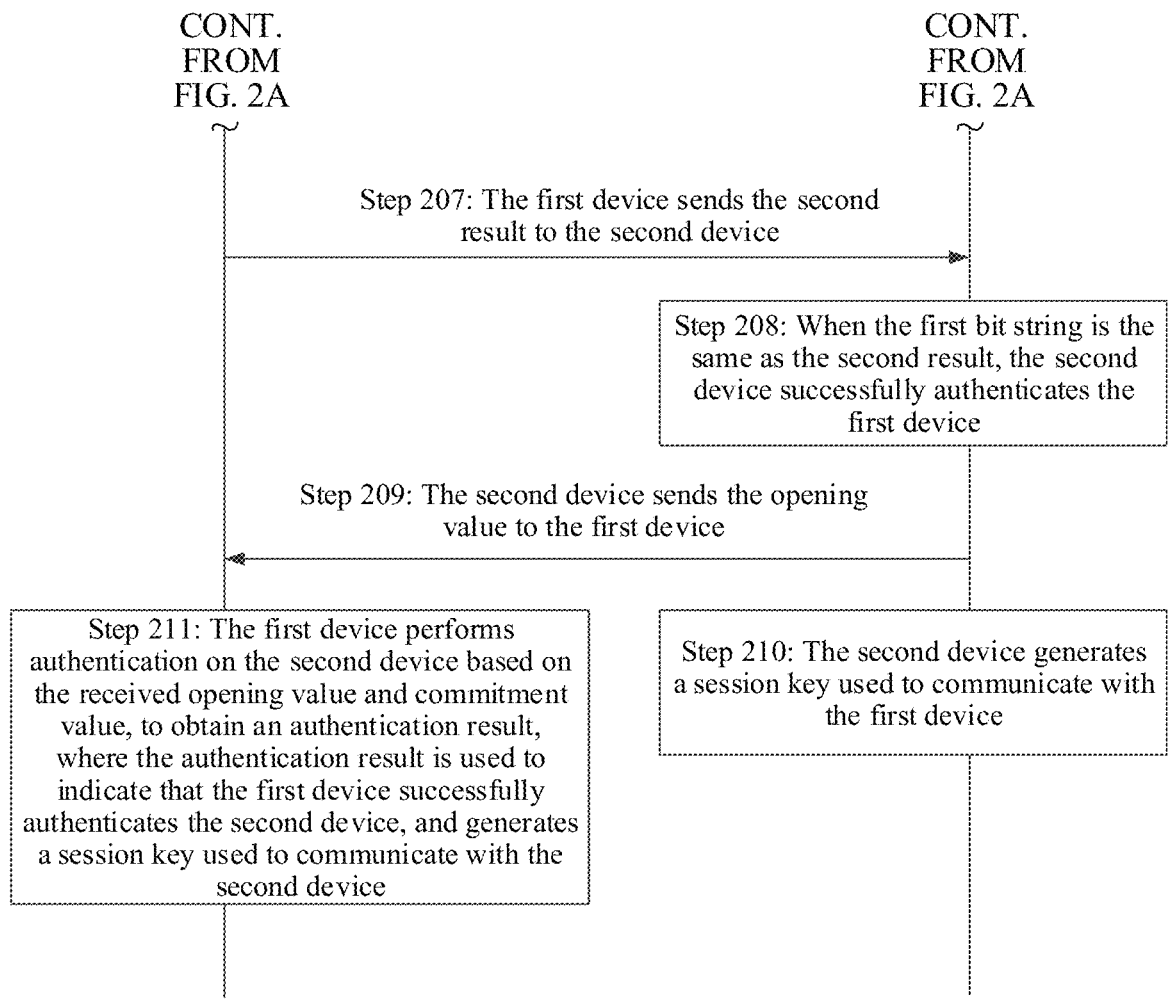

Descriptions are provided below by using an example in which two communication bodies are a first device and a second device. The first device and the second device may be any two devices that need to perform key agreement. The first device initiates key agreement with the second device. Referring to FIG. 2A and FIG. 2B, an embodiment of this application provides a key agreement method, to implement simple and efficient quantum secure key agreement. The method includes the following steps.

Step 201: The first device generates a private-public key pair by using a key generation algorithm.

In a possible implementation, the first device may generate the private-public key pair by using the key generation algorithm included in a KEM. The KEM may be any one of a ring learning with error (RLWE) KEM, a learning parity with noise (LPN) KEM, a Number Theorist aRe Us (NTRU) KEM, or a DH KEM.

Step 202: The first device sends a public key in the private-public key pair to the second device. The first device may send the public key to the second device over a public channel.

Step 203: The second device selects an original key based on the received public key by using an encapsulation algorithm, obtains a ciphertext based on the original key and the public key by using the encapsulation algorithm, obtains a commitment value and an opening value based on a first bit string and a random number by using a commitment algorithm, determines a second bit string based on some bits in the original key, and calculates a first result based on the first bit string and the second bit string.

In a possible implementation, the second device selects the original key based on the public key by using the encapsulation algorithm included in the KEM, and further obtains the ciphertext based on the original key and the public key by using the encapsulation algorithm included in the KEM. It should be understood that the encapsulation algorithm used by the second device herein and the key generation algorithm used by the first device in step 201 belong to a same KEM.

The second device may randomly generate the first bit string, use the first bit string as an input message, select the random number, and run the commitment algorithm, to obtain the commitment value and the opening value. Alternatively, the second device selects the random number; and runs a hash algorithm for the first bit string and the random number to obtain the commitment value, and uses the random number as the opening value. It should be understood that, in a specific implementation process of this embodiment of this application, both the communication bodies may pre-determine or pre-configure at least one commitment scheme or at least one hash algorithm, and use a same commitment scheme or hash algorithm for key agreement communication.

The second device may determine the second bit string based on the some bits in the original key. The first bit string generated by the second device may be a random L-bit string, where a value of L may range from 20 to 30. A length of the second bit string is the same as that of the first bit string, and the second bit string is a bit string including any L bits in the original key, for example, consecutive L bits in most significant bits or least significant bits in the original key, or L inconsecutive bits in the original key. A manner of determining the second bit string is not limited in this embodiment of this application.

The second device may obtain the first result based on the first bit string and the second bit string by using a first algorithm. The first algorithm is any one or a combination of an exclusive OR operation, a modulo addition operation, a modulo subtraction operation, or a modulo multiplication operation. For example, the first algorithm is the exclusive OR operation. In this case, the second device may use, as the first result, an exclusive OR result calculated based on the first bit string and the second bit string through the exclusive OR operation. It should be understood that the second device may alternatively "mix" the first bit string and the second bit string by using an algorithm other than the first algorithm described above, to obtain the first result. This is not limited in this embodiment of this application. Only an example in which the exclusive OR result calculated based on the first bit string and the second bit string through the exclusive OR operation is used as the first result is used for description in the following.

Step 204: The second device sends the ciphertext and the commitment value to the first device. Herein, the second device may send the ciphertext and the commitment value to the first device over the public channel.

Step 205: The first device obtains the first result. Specifically, the first device may obtain the first result by using, but not limited to, the following solutions.

Solution A: A staff member inputs the first result calculated by the second device in step 203 to the first device. For example, the staff member manually obtains the first result from the second device through reading, viewing, listening, or the like, and then inputs the first result to the first device. In this case, the second device needs to have a simple output port, and the first device needs to have a simple input port. A device output port may be a simple display, light color, light blinking, sound, or the like; and a device input port may be a simple keyboard or button, or the like. In a possible design, when the first bit string has a length of 20 bits to 30 bits, and the length of the second bit string is the same as that of the first bit string, the first result is an exclusive OR result calculated by the second device based on the first bit string and the second bit string through an exclusive OR operation. In this case, a length of the first result is the same as that of the first bit string, and is also 20 bits to 30 bits. In this way, the staff member does not perform cumbersome input operations. This solution is fairly feasible.

Solution B: A staff member uses the first device to scan a two-dimensional code or another identifier corresponding to the first result determined by the second device in step 203, so that the first device obtains the first result.

Solution C: The first device scans a two-dimensional code or another identifier corresponding to the first result determined by the second device in step 203. For example, the first device may automatically move near to the second device, and collect, through a camera on the first device, the first result displayed on a display of the second device, or the two-dimensional code or the another identifier that corresponds to the first result and is displayed on a display of the second device, so that the first device obtains the first result.

It should be understood that the foregoing solutions are merely examples, and are not intended to limit this embodiment of this application. In this application, it is assumed that a process in which the first device obtains the first result is relatively secure, in other words, an attacker cannot obtain the first result.

Step 206: The first device obtains the original key based on a private key in the private-public key pair and the received ciphertext by using a decapsulation algorithm, determines the second bit string based on the some bits in the original key, and calculates a second result based on the second bit string and the first result.

In a possible implementation, the first device may obtain the original key based on the private key in the private-public key pair and the ciphertext by using the decapsulation algorithm included in the KEM. Similarly, the decapsulation algorithm used by the first device, the encapsulation algorithm used by the second device in step 203, and the key generation algorithm used by the first device in step 201 belong to a same KEM. In a specific implementation process of this embodiment of this application, both the communication bodies may pre-determine or pre-configure at least one KEM, and select a same KEM for key agreement communication. For example, a device A generates a private-public key pair by using a key generation algorithm in the LPN KEM, and sends a public key in the private-public key pair to a device B. After receiving the public key sent by the device A, the device B selects an original key based on the public key by using an encapsulation algorithm included in the LPN KEM, obtains a ciphertext based on the public key and the original key, and sends the ciphertext to the device A. After receiving the ciphertext sent by the device B, the device A obtains the original key based on a private key in the private-public key pair and the ciphertext by using a decapsulation algorithm included in the LPN KEM.

It should be understood that a manner used by the first device to determine the second bit string is the same as a manner used by the second device to determine the second bit string, to ensure that the second bit string determined by the second device is the same as the second bit string determined by the first device. Further, the first device may calculate the second result based on the second bit string and the first result by using an algorithm that is used by the second device to calculate the first result. For example, the second device calculates the first result based on the first bit string and the second bit string through the exclusive OR operation. In this case, the first device calculates the second result based on the second bit string and the first result through the exclusive OR operation.

Step 207: The first device sends the second result to the second device. The first device may send the second result to the second device over the public channel.

Step 208: When the first bit string is the same as the second result, the second device successfully authenticates the first device. When the first bit string is different from the second result, the second device fails to authenticate the first device. In this case, the first device needs to perform key agreement with the second device again. The first device may re-generate a private-public key pair, and repeat the foregoing steps until the second device successfully authenticates the first device in step 208.

Step 209: The second device sends the opening value to the first device. The second device may send the opening value to the first device over the public channel. The opening value herein is the opening value obtained in step 203.

Step 210: The second device generates a session key used to communicate with the first device. The second device may generate the session key used to communicate with the first device, based on one or more of the following parameters: an identifier of the first device, an identifier of the second device, the public key, the ciphertext, the commitment value, the opening value, the original key, or the second result. For example, the second device generates the session key used to communicate with the first device, based on the identifier of the first device, the identifier of the second device, the public key, and the original key. For another example, the second device may generate, by using a hash function, the session key used to communicate with the first device, based on the identifier of the first device, the identifier of the second device, the public key, the ciphertext, the commitment value, the opening value, the original key, and the second result.

In addition, after generating the session key used to communicate with the first device, the second device may delete the public key, to save storage space of the second device. The second device re-generates a private-public key pair when initiating key agreement again with the first device or when initiating key agreement with a third device. The third device is any device other than the first device. In the prior art, both communication bodies need to store a private-public key pair, a password, and the like as materials for key agreement and authentication. Consequently, large storage space is occupied. However, in this embodiment of this application, the second device deletes the public key after generating the session key used to communicate with the first device. In this way, storage space can be saved. Therefore, the method provided in this embodiment of this application is more applicable to a device with a limited hardware capability.

It should be understood that a sequence of steps 209 and 210 may be reversed, or steps 209 and 210 may be performed at the same time. An execution sequence of the two steps is not limited in this application.

Step 211: The first device performs authentication on the second device based on the received opening value and commitment value, to obtain an authentication result, where the authentication result is used to indicate that the first device successfully authenticates the second device, and generates a session key used to communicate with the second device.

If the commitment value and the opening value are obtained by the second device based on the first bit string and the random number, the first device obtains a third result based on the opening value and the commitment value by using an opening algorithm (in other words, the first bit string is decrypted based on the opening value and the commitment value by using the opening algorithm). When the first device determines that the third result is the same as the second result (in other words, the first device determines that the first bit string is the same as the second result), the first device determines that the first device successfully authenticates the second device. It should be understood that the commitment algorithm used by the second device and the opening algorithm used by the first device belong to a same commitment scheme.

Alternatively, if the commitment value is obtained by the second device based on the first bit string and the random number by using the hash algorithm, and the opening value is the random number, the first device generates a fourth result (in other words, re-generates a commitment value) based on the opening value and the second result by using the hash algorithm. When the first device determines that the fourth result is the same as the commitment value (in other words, the first device determines that the two commitment values are the same), the first device determines that the first device successfully authenticates the second device. It should be understood that the hash algorithm used by the second device and the hash algorithm used by the first device are the same.

In addition, the session key that is generated by the first device and used to communicate with the second device is the same as the session key that is generated by the second device and used to communicate with the first device. In other words, the first device and the second device generate a same key based on a same parameter by using a same function.

After generating the session key used to communicate with the second device, the first device may delete the private-public key pair. The first device re-generates a private-public key pair when initiating key agreement again with the second device, and performs key agreement with the second device based on the newly generated private-public key pair, to save storage space of the first device. Alternatively, the first device re-generates a private-public key pair when initiating key agreement with the third device. The third device is any device other than the first device. In the prior art, both communication bodies need to store a private-public key pair, a password, and the like as materials for key agreement and authentication. Consequently, large storage space is occupied. However, in this embodiment of this application, the first device does not store a private-public key pair. In this way, storage space can be saved. Therefore, the method provided in this embodiment of this application is more applicable to a device with a limited hardware capability.

Figure 3:
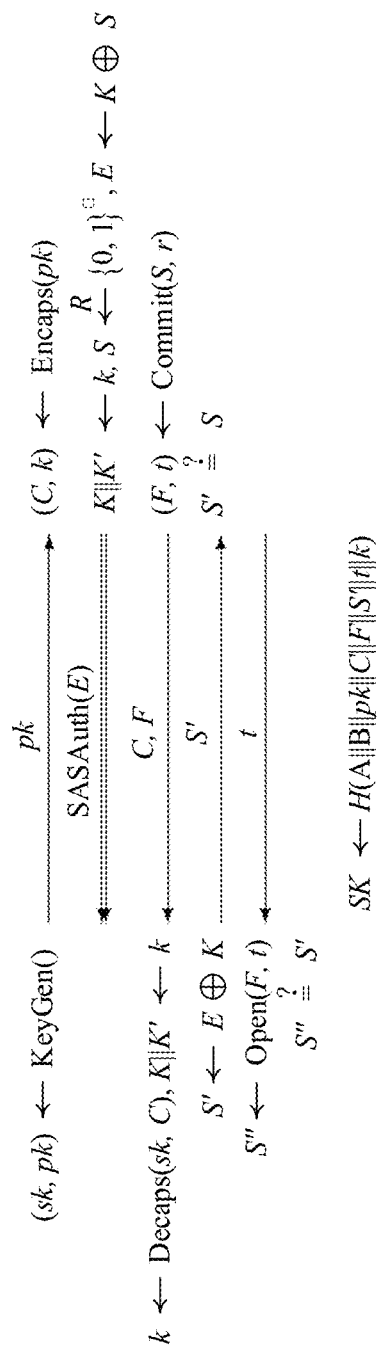
FIG. 3 is a detailed schematic flowchart of key agreement performed between devices A and B according to an embodiment of this application.

The following describes the key agreement method provided in the embodiment shown in FIG. 2A and FIG. 2B by using a key agreement process between devices A and B as an example. Details are as shown in FIG. 3.

The device A may generate a random private-public key pair (sk and pk) by using the key generation algorithm included in the KEM, and send a public key pk to the device B over a public channel. The device A stores a private key sk.

The device B may select an original key k based on the public key pk by using the encapsulation algorithm included in the KEM, calculate a ciphertext C based on the original key k and the public key pk, mark L consecutive high bits in the original key k as a second bit string K, and use an exclusive OR result of the second bit string K and a first bit string S (which is a random L-bit string) as a first result E, where E=K⊕S. For example, a staff member may read the first result E from the device B and then inputs the first result E to the device A. In addition, the device B performs calculation by using the commitment algorithm included in the commitment scheme, performs commitment on the first bit string S, and selects a random number r, to obtain a commitment value F and an opening value t. The device B may send the ciphertext C and the commitment value F to the device A over the public channel.

The device A may obtain the original key k based on the private key sk and the ciphertext C by using the decapsulation algorithm included in the KEM, determine the L consecutive high bits in the original key k as the second bit string K, and then perform the exclusive OR operation on the second bit string K and the first result E, to obtain a second result S', where S'=K⊕E. The device A may send the second result S' to the device B over the public channel.

The device B checks whether the second result S' is equal to the first bit string S: If the second result S' is not equal to the first bit string S, the device B may determine that authentication on the device A fails, and does not continue to perform key agreement. If the second result S' is equal to the first bit string S, the device B may determine that authentication on the device A succeeds, and may send the opening value t to the device A over the public channel.

After receiving the opening value t, the device A may obtain a third result S" based on the commitment value F and the opening value t by using the opening algorithm included in the commitment scheme. Further, the device A checks whether the third result S" is equal to the second result S'. If the third result S" is equal to the second result S', the device A may determine that authentication on the device B succeeds. If the third result S" is not equal to the second result S', the device A may determine that authentication on the device B fails.

If both devices A and B are authenticated, the devices A and B calculate a session key SK=H(A||B||pk||C||F||S'||t||k), where A and B are an identifier of the device A and an identifier of the device B respectively. All B||pk||C||F||S'||t||k may be considered as a session identifier (Session ID).

Alternatively, a hash function H(S, r) may be used to replace the commitment scheme. Specifically, when performing commitment on the first bit string S, the device B selects a random number r, calculates a commitment value F=H(S, r), and sets an opening value t=r. After receiving the opening value t, if determining that the opening value t satisfies F=H(S', t), or calculating a fourth result F'=H(S', t) and determining that F'=F, the device A may determine that authentication on the device B succeeds.

Specific implementation processes of the embodiments shown in FIG. 2A, FIG. 2B, and FIG. 3 are described below with reference to specific KEMs.

It should be understood that the following four embodiments each describe in detail only a process of using a specific KEM by two communication bodies (for example, a device A and a device B). Other processes are similar to those in the foregoing embodiments, and are not described herein again.

Embodiment 1: The KEM is an RLWE KEM

The KEM is a specific KEM proposed in CRYSTALS. The CRYSTALS is a candidate algorithm suite in a post-quantum cryptography contest of the National Institute of Standards and Technology (NIST). The CRYSTALS includes encryption, signature, and key agreement mechanisms. This KEM is a typical lattice-based cryptography scheme.

The RLWE KEM operates on a polynomial ring $R_q=Z_{qc}[x]/(x^n+1)$, where q is a prime number, n is an integer, x is a polynomial variable, and $Z_p$ represents all residue classes modulo a prime number p, that is, $Z_p=\{0, 1, 2, \ldots, p-1\}$. Each element of $R_q$ is a polynomial of a degree not exceeding n−1. In addition, χ is used to represent discrete Gaussian distribution of $R_q$. The following describes details of the RLWE KEM algorithm and usage of the RLWE KEM.

Key generation: The device A may randomly select s, $e \in \chi^k$ and calculate b=As+e, where k is a positive integer, and $A \in R_q^{k \times k}$ is a matrix with k rows and k columns. The device A stores s as a KEM private key and sends a KEM public key (A, b) to the device B.

Encapsulation process: After receiving the KEM public key (A, b), the device B may randomly select t, $f \in \chi^k$, calculate $c=A^T t+f$, and send a ciphertext c to the device A. The ciphertext c herein is obtained after encryption is performed on an original key $b^T t$. $b^T t \in R_q$ is a polynomial of an n−1 degree, and parity of each coefficient in $b^T t \in R_q$ indicates 1 bit of the original key.

Decapsulation process: After receiving the ciphertext c, the device A may calculate $s^T c \in R_q$ based on the KEM private key s, and use $s^T c$ as an original key.

A key problem in KEM implementation lies in that $b^T t$ and $s^T c$ are not absolutely equal. It should be understood that $b^T t$ and $s^T c$ can be very approximate provided that a related parameter and vector are properly selected. During decapsulation, the device A needs to perform proper reconciliation on the ciphertext and the decrypted original key, in other words, some approximate and encoding operations need to be performed. In this way, the KEM decapsulation is very unlikely to fail.

In addition, to reduce transmitted data, in a possible design, a polynomial matrix A included in the KEM public key (A, b) may be calculated based on a 256-bit random seed by using a given method. In this way, the device A only needs to send a random number and b to the device B, and does not need to send an entire matrix A.

The following shows parameters provided by the CRYSTALS, a candidate algorithm for NIST post-quantum cryptography algorithm standardization, which may serve as a specific implementation of this embodiment of this application.

System parameters: n=256, q=7681=213−29+1, k=3.

For the system parameters, the KEM public key is 1088 bytes, the KEM private key is 2400 bytes, the ciphertext is 1184 bytes, the original key has a length of 256 bits, and a decapsulation failure rate is $2^{-142}$.

In addition, a KEM private-public key pair used by the device A and the device B is temporarily generated and used only once. Therefore, different from the prior art in which a decryption failure may cause partial leakage of private key information, the KEM decapsulation failure herein only means that both communication parties need to generate and use another KEM private-public key pair. Therefore, the system parameters may be optimized, to reduce sizes of the KEM private key, the KEM public key, and the ciphertext by properly increasing the decapsulation failure rate, and to improve computing and communication efficiencies.

Embodiment 2: The KEM is an LPN KEM

The LPN KEM operates in a binary field $Z_2$. Parameters n, q, N, L, and D are positive integers. Parameters n and q needs to be properly selected to ensure that an LPN problem is difficult, where n determines a size of a ciphertext. N indicates a bit length of a codeword of an error-correcting code C[N, L, D], and also indicates a bit length of encapsulated information after encoding. The error-correcting code C[N, L, D] means that information with a length of L bits is encoded into an N-bit codeword. A Hamming distance between valid codewords is at least D. $Ber_\tau$ denotes Bernoulli distribution with a parameter $\tau$. To be specific, the distribution outputs 1 with a probability of $\tau$, and outputs 0 a probability of 1−$\tau$. K indicates a bit length of information before encoding. For the given Bernoulli distribution parameter $\tau$, the parameter D determines a quantity of errors that can be corrected in an encapsulated message. It is recommended herein that a percentage of errors that can be corrected does not exceed 10%. The following describes details of the LPN KEM algorithm and usage of the LPN KEM.

Key generation: The device A may randomly select matrices $S \in Z_2^{n \times N}$, $A \in Z_2^{q \times N}$, and $E \in Ber_\tau^{q \times N}$, and calculate B=AS+E. Then, the device A stores S as a KEM private key and sends a KEM public key (A, B) to the device B.

Encapsulation process: After receiving the KEM public key (A, B), the device B may select a random vector $f \in Ber_\tau^q$, use $f^T B \in Z_2^{1 \times N}$ as an original key, and calculate and send a ciphertext $u^T = f^T A$ to the device A.

Decapsulation process: After receiving the ciphertext $u^T$, the device A may calculate $u^T S \in Z_2^{1 \times N}$ based on the KEM private key S, and use $u^T S \in Z_2^{1 \times N}$ as an original key.

Similarly, a key problem in LPN KEM implementation lies in that $u^T S$ and $f^T B$ are not absolutely equal. It should be understood that, E and f are a noise matrix and a noise vector respectively, and bit values of $f^T B$ and $f^T B$ get fairly close to each other at a high probability as long as a proper related parameter is selected. Actually, an average Hamming weight of $f^T B - u^T S = f^T E$ is $Nq\tau^2$. Therefore, $u^T S$ calculated by the device A can equal to the original key $f^T B$ of the device B at a high probability as long as $Nq\tau^2 < D/2$.

Specifically, for a real original key c of i bits, the device B may divide c into j blocks, and each block has a length of L bits (a last block is padded). Herein, (j−1)N<i≤jN. Then, the error-correcting code C[N, L, D] is used to encode the L bits of each block into an N-bit codeword. Each codeword is considered as a row vector (that is, $f^T B$ in the foregoing solution), with one row and N columns, of $Z_2^{1 \times N}$. The device B may encapsulate the codeword based on the KEM public key, and then send an encapsulated codeword to the device A. After receiving all j blocks of encapsulated information, the device A may decapsulate the j blocks based on the KEM private key, decode each of the blocks by using the error-correcting code C[N, L, D], and restore the true original key c having a length of i bits. A key point herein lies in that proper parameters need to be selected so that an error (that is, $f^T B - u^T S$) between encapsulation and decapsulation can be considered as an error and be corrected at a high probability by the error-correcting code C[N, L, D].

In the following, two solutions are recommended to ensure that a probability of correct error correction is at least 90% (in other words, a decapsulation failure rate does not exceed 10%).

Solution 1: A Golay code [23, 12, 7] is used to transmit a 140-bit real original key c.

First, the device B may divide the 140-bit true original key c into 12 blocks, and each block has 12 bits (4 bits of the last block are padded in a proper manner).

Then, the device B may encode each 12-bit block into a 23-bit codeword based on the Golay code [23, 12, 7]. In this way, a total of 12 codewords are generated.

Next, the device B encapsulates the 12 codewords based on the KEM public key, and sends an obtained encapsulation result to device A.

The device A may decapsulate received 12 encapsulated blocks based on the KEM private key, and then decode and correct an obtained result based on the Golay code [23, 12, 7], to restore the 140-bit true original key c.

In order that the device A can correctly perform error correction, in other words, that a correct true original key c can be restored, FIG. 4 shows, in a first column and a second column, recommended LPN KEM parameters (q, $\tau$).

If parameters (q=512, $\tau$=0.0029), and n=512 are used, related performance indicators for transmitting the 140-bit real original key are as follows: The public key is 34240 bytes, the private key is 1472 bytes, the ciphertext is 64 bytes, and the decapsulation failure rate is 10%.

In a possible design, to reduce a size of A in the KEM public key (A, B), the device B may choose to generate A by using a 256-bit random number seed. In this case, a size of the KEM public key is reduced to 1504 bytes.

Solution 2: A concatenated code is used for encoding, to transmit a 140-bit real original key c. For example, Reed-Solomon [15, 7, 9] may be used as an outer code, and Hamming [7, 4] with a single-bit error correction capability may be used as an inner code.

First, the device B may divide the 140-bit true original key c into five blocks, and each block has 28 bits.

Then, the device B may encode each 28-bit block by using the outer code Reed-Solomon [15, 7, 9]. To be specific, 28 bits are considered as seven 4 bits, and every 4 bits are used as one letter of Reed-Solomon [15, 7, 9]. In this way, one 28-bit block is encoded into one Reed-Solomon [15, 7, 9] codeword of 15×4=60 bits. The five blocks are encoded into five codewords in total with a length of 5×60=300 bits.

Next, the device B encodes each letter (whose length is 4 bits) in the five Reed-Solomon codewords obtained in the previous step by using the inner code Hamming [7, 4]. To be specific, each 4-bit letter is encoded into a 7-bit Hamming [7, 4] codeword. In this way, a total of 5×15=75 Hamming [7, 4] codewords are obtained for the five blocks.

Subsequently, the device B encapsulates the 75 Hamming [7, 4] codewords (a total of 5×15×7=525 bits) based on the KEM public key, and sends an obtained encapsulation result to the device A.

After receiving the encapsulation result, the device A may first perform decapsulation base on the KEM private key, decode and correct an obtained result based on the inner code Hamming [7, 4], and perform decoding and correction based on the outer code Reed-Solomon [15, 7, 9], to restore the 140-bit true original key c.

In order that the device A can correctly perform error correction at a probability not less than 90% to restore a correct true original key c, FIG. 3 shows, in a first column and a third column, recommended LPN KEM parameters (q, τ).

If parameters (q=512, τ=0.0063, n=512, N=105, and L=28) are used, related performance indicators for transmitting the 140-bit real original key are as follows: The KEM public key is 39488 bytes, the KEM private key is 6720 bytes, the ciphertext is 128 bytes, and the decapsulation failure rate is 10%.

Embodiment 3: The KEM is an NTRU KEM

NTRU has been standardized in the IEEE 1394 and currently is promoted for standardization by the IETF. The NTRU is also a candidate algorithm for a NIST post-quantum standardization project. Similar to an RLWE KEM, the NTRU also operates on a polynomial ring $R_q=Z_q[x]/(x^n+1)$, where q is a prime number and a system parameter, and is known and public; and an integer n indicates a bit length of a to-be-encapsulated key or a to-be-encapsulated message. In addition, $R_{q,s}$ is used to represent polynomials of all small coefficients in $R_q$. The following describes the NTRU KEM algorithm and usage of the NTRU KEM.

Key generation: The device A may randomly select a small-coefficient polynomial $g \in R_{q,s}$ as a KEM private key, calculate and use $h=f/g \in R_q$ as a KEM public key, and send $h=f/g \in R_q$ to the device B, where $f \in R_{q,s}$ is another random small-coefficient polynomial.

Encapsulation process: After receiving the KEM public key $h \in R_q$, the device B considers each bit of an n-bit original key $m \in Z_2^n$ as a small-coefficient polynomial with a coefficient of 0 or 1. The device B may select two random polynomials r, $e \in R_{q,s}$ to enable m=e mod 2, calculate c=2 hr+e$\in R_q$, and send c to the device A. The ciphertext c herein is obtained after encryption of the original key m.

Decapsulation process: After receiving c, the device A may calculate ((cg mod q)mod 2)/g$\in R_q$ based on the KEM private key g, and use a result as an original key.

Similarly, a key problem in NTRU KEM implementation lies in that ((cg mod q)mod 2)/g and e mod 2 are not absolutely equal. It should be understood that, ((cg mod q)mod 2)/g and e mod 2 are very likely to be equal as long as a related parameter is properly selected and g, f, r, $e \in R_{q,s}$ is small enough. In other words, the foregoing NTRU KEM decapsulation may fail at a very low probability after proper reconciliation.

Based on system parameters recommended for the NTRU, the NTRU KEM may use the following parameters for 128-bit quantum security:

System parameter: n=512, q=12289 (14 bits). For a small coefficient, an element in a set {0, ±1, ±2, . . . , ±12} is selected.

For the system parameters, the KEM public key is 896 bytes, the KEM private key is 320 bytes, the ciphertext is 896 bytes, an encapsulated original key has a length of 512 bits, and a decapsulation failure rate is $2^{-30}$. The 128-bit quantum security is a concept of password strength, which means that $2^{128}$ cryptographic operations need to be performed to crack a cryptosystem.

Alternatively, n in the system parameters may be set to 1024 if the original key has a longer length.

Embodiment 4: The KEM is a DH (Diffie-Hellman) KEM

Figure 5:
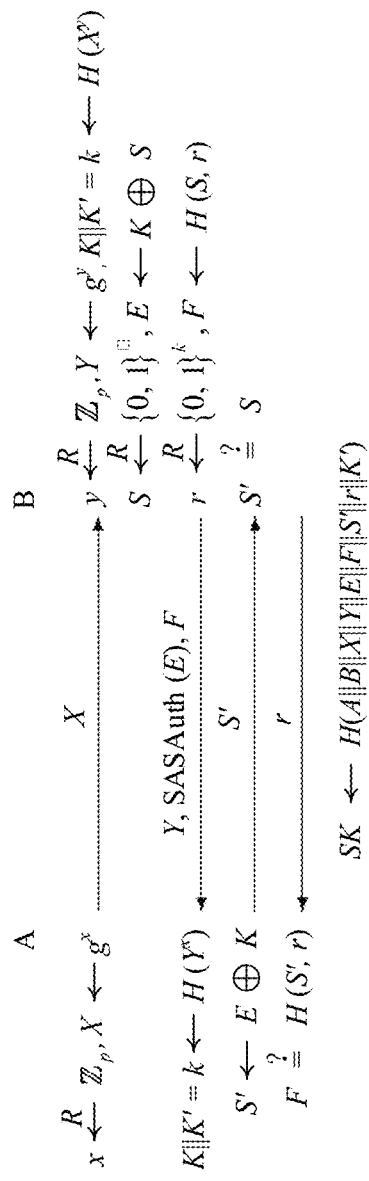
FIG. 5 is a detailed schematic flowchart of a key agreement method based on a DH KEM according to an embodiment of this application.

Different from the foregoing three embodiments, because a DH problem is no longer secure in quantum computing, a key agreement method using the DH KEM is not quantum secure. However, the method is still of practical significance. Specific practical significance may include but is not limited to the following aspects: First, before the quantum computer comes into being, the method is secure and can be used in a proper scenario. Second, compared with the foregoing three embodiments based on lattice cryptography, lengths of KEM public and private keys corresponding to the key agreement method using the DH KEM are significantly reduced, and are ¼ to 1/30 of those based on the lattice cryptography. Therefore, communication efficiency is greatly improved.

p is set to a prime number, G is a p-order multiplicative group, and g$\in$G is a generator of the group G. H( ) is a secure hash function, and outputs κ bits. The key agreement method that is based on the DH KEM is shown in FIG. 5, and is specifically described as follows:

The device A may randomly select $x \in Z_p$ as a KEM private key, calculate a KEM public key $X=g^x \in G$, and send X to the device B over a public channel. The device A stores the KEM private key x.

After receiving the KEM public key X, the device B may randomly select $y \in Z_p$, set an original key to $k=H(X^y)$, and calculate a key encapsulation value $C=Y=g^y \in G$. The device B determines an exclusive OR result E (that is, E=K⊕S) of 1 most significant bits K in k and a random 1-bit string S. The device A obtains E (specifically, any solution provided in step 105 may be used). The device B may select a random number $r \in \{0, 1\}^{4k}$, calculate and use F=H(S, r) as a commitment value of S, and send (Y, F) to the device A over the public channel.

The device A uses the KEM private key x to decrypt Y and obtains k, that is $k=H(Y^x)$, and obtains K based on k. Then, the device A performs an exclusive OR operation on K and E to obtain S' (that is, S'=K'⊕E), and sends S' to the device B.

The device B checks whether S' is equal to S: If S' is not equal to S, the device B does not continue to perform key agreement. If S' is equal to S, the device B successfully authenticates the device A, and sends a committed opening value r to the device A.

After receiving the opening value r, the device A checks whether F is equal to H(S', r). If F is equal to H(S', r), the device A successfully authenticates the device B. If F is not equal to H(S', r), the device A fails to authenticate the device B.

If both devices A and B are authenticated, the devices A and B calculate a session key SK=H(A||B||X||Y||F||S'||r||k). Similar to a conventional cryptosystem based on a discrete logarithm problem (for example, a digital signature algorithm standard (DSA) standard signature, a Schnorr signature, or ElGamal encryption), the foregoing DH KEM has two typical parameter selections: a residue class group and an elliptic curve group. Specifically, the group G in the solution may be selected as a p-order multiplicative subgroup of a finite field $Z_q$, where p and q are prime numbers, and p|q−1. Generally, a bit length of p may be 1024, 1536, or 2048, and a bit length of q may be 128 or 256. Alternatively, G may be a 256-bit elliptic curve group, and a bit length of q may be 128 or 256.

It can be learned from the foregoing embodiments that, according to the method provided in the embodiments of this application, only one temporary KEM public key pair is generated and used during agreement, and both communication parties perform a total of two KEM encryption and decryption operations, and perform some simple commitment operations. Therefore, compared with a Kyber protocol and a quantum protocol with optimized system parameters in the prior art, the solution of this application has efficiency significantly improved while security is ensured to some extent. In addition, the solution of this application is easy to implement.

The method provided in the embodiments of this application is proved strictly secure. Specifically, if both the KEM and the commitment scheme that are used are secure, the method provided in the embodiments of this application is secure in a standard model. If both the KEM and the hash function that are used are secure, the method provided in the embodiments of this application is secure in a random oracle model. In addition, if the used KEM is quantum secure, the method provided in the embodiments of this application is quantum secure.

Figure 6:
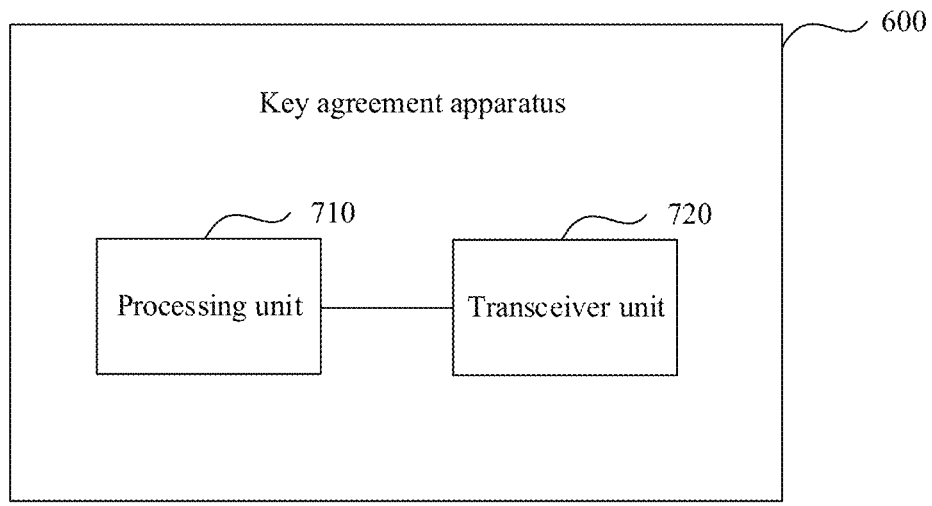
FIG. 6 is a first schematic structural diagram of a key agreement apparatus according to an embodiment of this application.

Based on the foregoing embodiments, an embodiment of this application provides a key agreement apparatus 600. In an example, the key agreement apparatus 600 may be included in a first device in a key agreement system. As shown in FIG. 6, the apparatus 600 includes a processing unit 610 and a transceiver unit 620.

The processing unit 610 is configured to generate a private-public key pair by using a key generation algorithm.

The transceiver unit 620 is configured to: send a public key in the private-public key pair to a second device and receive a ciphertext and a commitment value, where the ciphertext is obtained based on the public key and an original key by using an encapsulation algorithm, the original key is selected based on the public key by using the encapsulation algorithm, and the commitment value is obtained based on a first bit string and a random number by using a commitment algorithm, where the first bit string is a random bit string.

The transceiver unit 620 is further configured to obtain a first result, where the first result is calculated based on the first bit string and a second bit string, and the second bit string is determined based on some bits in the original key.

The processing unit 610 is further configured to: obtain the original key based on a private key in the private-public key pair and the ciphertext by using a decapsulation algorithm, determine the second bit string based on the some bits in the original key, and calculate a second result based on the second bit string and the first result.

The transceiver unit 620 is further configured to: send the second result to the second device and receive an opening value, where the opening value is sent by the second device to the first device when the first bit string is the same as the second result, and the opening value is obtained based on the first bit string and the random number by using the commitment algorithm.

The processing unit 610 is further configured to authenticate the second device based on the opening value and the commitment value, to obtain an authentication result, where the authentication result is used to indicate that the second device successfully authenticates the second device, and generates a session key used to communicate with the second device.

In another possible design, the processing unit 610 is specifically configured to:

calculate the second bit string and the first result by using a first algorithm, to obtain the second result.

The first algorithm is any one of an exclusive OR operation, a modulo addition operation, a modulo subtraction operation, or a modulo multiplication operation, or a combination thereof.

In another possible design, the processing unit 610 is further configured to:

delete the private-public key pair after generating the session key used to communicate with the second device; and re-generate a private-public key pair when initiating key agreement again with the second device or initiating key agreement with a third device.

In another possible design, the processing unit 610 is specifically configured to:

generate the session key used to communicate with the second device, based on one or more of the following parameters: an identifier of the first device, an identifier of the second device, the public key, the ciphertext, the commitment value, the opening value, the original key, or the second result.

Figure 7:
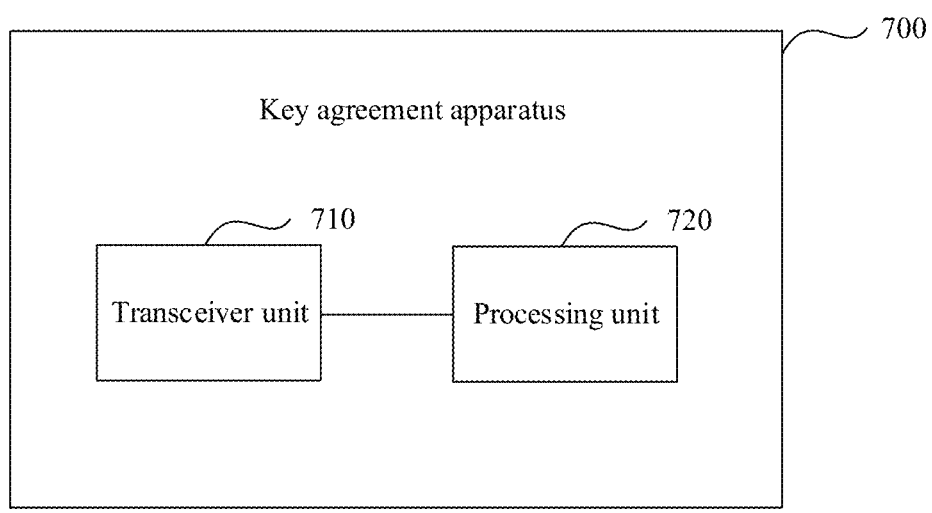
FIG. 7 is a second schematic structural diagram of a key agreement apparatus according to an embodiment of this application.

Based on the foregoing embodiments, an embodiment of this application provides a key agreement apparatus 700. In an example, the key agreement apparatus 700 may be included in a second device in a key agreement system. As shown in FIG. 7, the apparatus 700 includes a transceiver unit 710 and a processing unit 720.

The transceiver unit 710 is configured to receive a public key, where the public key is a public key in a private-public key pair generated by using a key generation algorithm.

The processing unit 720 is configured to: select an original key based on the public key by using an encapsulation algorithm, obtain a ciphertext based on the public key and the original key by using the encapsulation algorithm, and obtain a commitment value and an opening value based on a first bit string and a random number by using a commitment algorithm. The transceiver unit 710 is further configured to send the ciphertext and the commitment value to the first device. The first bit string is a random bit string.

The processing unit 720 is further configured to: determine a second bit string based on some bits in the original key, and calculate a first result based on the first bit string and the second bit string.

The transceiver unit 710 is further configured to receive a second result, where the second result is calculated based on the second bit string and the first result.

The processing unit 720 is further configured to: when the first bit string is the same as the second result, generate a session key used to communicate with the first device. That the first bit string is the same as the second result indicates that the second device successfully authenticates the first device. The transceiver unit 710 is further configured to send the opening value to the first device.

In another possible design, the processing unit 720 is specifically configured to:

calculate the first bit string and the second bit string by using a first algorithm, to obtain the first result.

The first algorithm is any one of an exclusive OR operation, a modulo addition operation, a modulo subtraction operation, or a modulo multiplication operation, or a combination thereof.

In another possible design, the processing unit 720 is further configured to:

delete the public key after generating the session key used to communicate with the first device; and generate a private-public key pair when initiating key agreement again with the first device or initiating key agreement with a third device.

In another possible design, the processing unit 720 is specifically configured to:

generate the session key used to communicate with the first device, based on one or more of the following parameters: an identifier of the first device, an identifier of the second device, the public key, the ciphertext, the commitment value, the opening value, the original key, or the second result.

It may be understood that, for specific implementations of function modules included in the key agreement apparatuses in FIG. 6 and FIG. 7 and corresponding beneficial effects, refer to specific descriptions of the embodiment shown in FIG. 2A and FIG. 2B. Details are not described herein.

It should be understood that division into the units is merely logical function division. During actual implementation, all or some of the units may be integrated into one physical entity, or may be physically separated. In addition, all of the units may be implemented in a form of software invoked by a processing element, or may be implemented in a form of hardware; or some units may be implemented in a form of software invoked by a processing element, and some units may be implemented in a form of hardware. In an implementation process, steps in the foregoing method or the foregoing units can be implemented through a hardware integrated logical circuit in a processor element, or through instructions in a form of software.

For example, the foregoing units may be configured as one or more integrated circuits for implementing the foregoing method, for example, one or more application-specific integrated circuits (ASIC), or one or more microprocessors (digital signal processor, DSP), or one or more field programmable gate arrays (FPGA). For another example, when one of the foregoing units is implemented by a processing element invoking a program, the processing element may be a general purpose processor, such as a central processing unit (CPU) or another processor that can invoke a program. For another example, the units may be integrated and implemented in a form of a system-on-a-chip (SOC).

In another optional variant, an embodiment of this application provides a key agreement apparatus. For example, the key agreement apparatus may be a chip, the apparatus includes a processor and an interface, and the interface may be an input/output interface. The processor implements the processing unit 610 in FIG. 6, and the interface implements the transceiver unit 620 in FIG. 6. Alternatively, the processor implements a function of the processing unit 720 in FIG. 7, and the interface implements a function of the transceiver unit 710 in FIG. 7. The apparatus may further include a memory. The memory is configured to store a program that can be run on the processor. When the processor executes the program, the method of the embodiment shown in FIG. 2A and FIG. 2B is performed.

Figure 8:
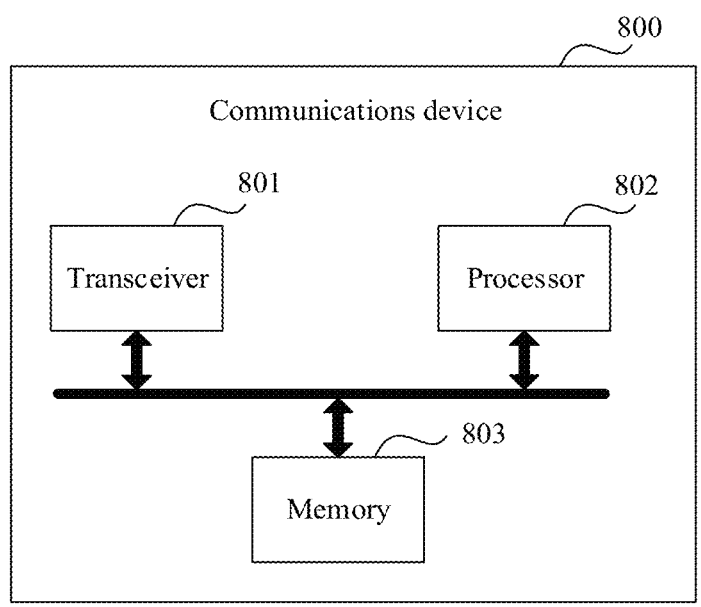
FIG. 8 is a schematic structural diagram of a communications device according to an embodiment of this application.

Based on the foregoing embodiments, an embodiment of this application further provides a communications device. As shown in FIG. 8, the communications device 800 includes a transceiver 801, a processor 802, and a memory 803. The memory 803 is configured to store a computer program. The processor 802 invokes the computer program stored in the memory 803, and performs, by using the transceiver 801, a step of the first device or a step of the second device in the method embodiment shown in FIG. 2A and FIG. 2B. The processor may be a CPU, a network processor (NP), a hardware chip, or any combination thereof. The memory may include a volatile memory, for example, a random access memory (RAM). Alternatively, the memory may include a nonvolatile memory, such as a read-only memory (ROM), a flash memory, a hard disk drive (HDD), or a solid-state drive (SSD). Alternatively, the memory may include a combination of the foregoing types of memories.

It may be understood that the apparatus in the embodiment shown in FIG. 6 or FIG. 7 may be implemented through the communications device 800 shown in FIG. 8. Specifically, in FIG. 6, the processing unit 610 may be implemented by the processor 802, and the transceiver unit 620 may be implemented by the transceiver 801. In FIG. 7, the processing unit 720 may be implemented by the processor 802, and the transceiver unit 710 may be implemented by the transceiver 801. A structure of the communications structure 800 does not constitute a limitation on the embodiments of this application.

An embodiment of this application provides a key agreement system including a first device and a second device. For example, the system may include two communications devices shown in FIG. 8. One device is configured to perform a step of the first device in the method embodiment shown in FIG. 2A and FIG. 2B, and the other device is configured to perform a step of the second device in the method embodiment shown in FIG. 2A and FIG. 2B.

An embodiment of this application further provides a computer-readable storage medium, where the computer-readable storage medium stores a computer program, and when the computer program is run on a computer, the computer is enabled to perform the method in the embodiment shown in FIG. 2A and FIG. 2B.

In conclusion, according to the method provided in the embodiments of this application, only one temporary KEM public key pair is generated and used during agreement, and both communication parties perform a total of two KEM encryption and decryption operations, and perform some simple commitment operations. Therefore, compared with a Kyber protocol and a quantum protocol with optimized system parameters in the prior art, the solution of this application has efficiency significantly improved while security is ensured to some extent. In addition, the solution of this application is easy to implement.

In addition, public and private keys in a current quantum security cryptosystem are large in size. These quantum security AKEs require that both communication parties have a quantum security private-public key pair for long-term use, which poses a challenge to a storage capability of a device. However, according to the method provided in the embodiments of this application, a private-public key pair does not need to be stored. A KEM private-public key pair used in a key protocol each time is temporary and can be deleted after being used once. Therefore, storage space of the device can be effectively saved.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

Alternatively, these computer program instructions may be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A key agreement system comprising:
a first device and a second device each having a hardware processor, wherein the first device is configured to:
    generate a private-public key pair by using a key generation algorithm, and send a public key in the private-public key pair to the second device;
the second device is configured to:
    select an original key based on the received public key by using an encapsulation algorithm,
    obtain a ciphertext based on the public key and the original key by using the encapsulation algorithm,
    obtain a commitment value and an opening value based on a first bit string and a random number by using a commitment algorithm,
    send the ciphertext and the commitment value to the first device, wherein the first bit string is a random bit string, and
    determine a second bit string based on a part of bits in the original key, and
determine a first result based on the first bit string and the second bit string;
the first device is further configured to:
    obtain the original key based on a private key in the private-public key pair and the received ciphertext by using a decapsulation algorithm,
    determine the second bit string based on the part of bits in the original key,
    determine a second result based on the second bit string and the first result, and
    send the second result to the second device;
the second device is further configured to, in response to the first bit string being the same as the received second result;
    send the opening value to the first device, and
    generate a session key used to communicate with the first device, wherein that the first bit string is the same as the second result indicates that the second device successfully authenticates the first device; and
the first device is further configured to:
    authenticate the second device based on the received opening value and commitment value to obtain an authentication result, wherein the authentication result indicates that the first device successfully authenticates the second device, and
    generates a session key used to communicate with the second device.

2. The system according to claim 1, wherein the second device is configured to determine the first bit string and the second result by using a first algorithm, to obtain the first result; and
the first device is configured to determine the second bit string and the first result by using the first algorithm, to obtain the second result,
    wherein the first algorithm is any one or a combination of an exclusive OR operation, a modulo addition operation, a modulo subtraction operation, or a modulo multiplication operation.

3. The system according to claim 1, wherein the first device is further configured to:
delete the private-public key pair after generating the session key used to communicate with the second device; and
re-generate a private-public key pair during an initiation of a key agreement again with the second device or an initiation of a key agreement with a third device.

4. The system according to claim 1, wherein the second device is further configured to:
delete the public key after generating the session key used to communicate with the first device; and
generate a private-public key pair during an initiation of a key agreement again with the first device or an initiation of a key agreement with the third device.

5. The system according to claim 1, wherein the first device is further configured to generate the session key used to communicate with the second device, based on one or more of the following parameters: an identifier of the first device, an identifier of the second device, the public key, the ciphertext, the commitment value, the opening value, the original key, or the second result; and
the second device is further configured to generate, based on the one or more parameters, the session key used to communicate with the first device,
    wherein the session key used to communicate with the second device is the same as the session key used to communicate with the first device.

6. A key agreement method comprising:
generating, by a first device, a private-public key pair by using a key generation algorithm, and sending a public key in the private-public key pair to a second device; and
receiving, by the first device, a ciphertext and a commitment value, wherein the ciphertext is obtained based on the public key and an original key by using an encapsulation algorithm, the original key is selected based on the public key by using the encapsulation algorithm, and the commitment value is obtained based on a first bit string and a random number by using a commitment algorithm, wherein the first bit string is a random bit string;
obtaining, by the first device, a first result, wherein the first result is determined based on the first bit string and a second bit string, and the second bit string is determined based on a part of bits in the original key;

obtaining, by the first device, the original key based on a private key in the private-public key pair and the ciphertext by using a decapsulation algorithm, and determining the second bit string based on the part of bits in the original key;

determining, by the first device, a second result based on the second bit string and the first result, and sending the second result to the second device;

receiving, by the first device, an opening value, wherein the opening value is sent by the second device to the first device in response to the first bit string being the same as the second result, and the opening value is obtained based on the first bit string and the random number by using the commitment algorithm; and performing, by the first device, authentication on the second device based on the opening value and the commitment value, to obtain an authentication result, wherein the authentication result indicates that the first device successfully authenticates the second device; and generating a session key used to communicate with the second device.

7. The method according to claim 6, wherein the determining the second result based on the second bit string and the first result comprises: determining the second result using a first algorithm based on the second bit string and the first result,
wherein the first algorithm is any one or a combination of an exclusive OR operation, a modulo addition operation, a modulo subtraction operation, or a modulo multiplication operation.

8. The method according to claim 6, wherein after the first device generates the session key used to communicate with the second device, the method further comprises:
deleting, by the first device, the private-public key pair; and
re-generating, by the first device, a private-public key pair during an initiation of a key agreement again with the second device or an initiation of a key agreement with a third device.

9. The method according to claim 6, wherein that the first device generates the session key used to communicate with the second device comprises:
generating, by the first device, the session key used to communicate with the second device, based on one or more of the following parameters: an identifier of the first device, an identifier of the second device, the public key, the ciphertext, the commitment value, the opening value, the original key, or the second result.

10. A key agreement method comprising:
receiving, by a second device, a public key, wherein the public key is a public key in a private-public key pair generated by using a key generation algorithm;
selecting, by the second device, an original key based on the public key by using an encapsulation algorithm, obtaining a ciphertext based on the public key and the original key by using the encapsulation algorithm, obtaining a commitment value and an opening value based on a first bit string and a random number by using a commitment algorithm, and sending the ciphertext and the commitment value to a first device, wherein the first bit string is a random bit string;
determining, by the second device, a second bit string based on a part of bits in the original key, and determining a first result based on the first bit string and the second bit string;

receiving, by the second device, a second result, wherein the second result is determined based on the second bit string and the first result; and in response to the first bit string being the same as the second result, sending, by the second device, the opening value to the first device and generating a session key used to communicate with the first device, wherein that the first bit string is the same as the second result indicates that the second device successfully authenticates the first device.

11. The method according to claim 10, wherein the determining the first result based on the first bit string and the second bit string comprises determining the first result by using a first algorithm based on the first bit string and the second bit string,
wherein the first algorithm is any one or a combination of an exclusive OR operation, a modulo addition operation, a modulo subtraction operation, or a modulo multiplication operation.

12. The method according to claim 10, wherein after generating the session key used to communicate with the first device, the method further comprises:
deleting, by the second device, the public key; and
generating, by the second device, a private-public key pair during an initiation of a key agreement again with the first device or an initiation of a key agreement with a third device.

13. The method according to claim 10, wherein the generating the session key used to communicate with the first device comprises:
generating, by the second device, the session key used to communicate with the first device, based on one or more of the following parameters: an identifier of the first device, an identifier of the second device, the public key, the ciphertext, the commitment value, the opening value, the original key, or the second result.

14. A key agreement apparatus comprising:
a processor configured to generate a private-public key pair by using a key generation algorithm; and
a transceiver configured to cooperate with the processor to send a public key in the private-public key pair to a second device and receive a ciphertext and a commitment value,
wherein the ciphertext is obtained based on the public key and an original key by using an encapsulation algorithm,
wherein the original key is selected based on the public key by using the encapsulation algorithm,
wherein the commitment value is obtained based on a first bit string and a random number by using a commitment algorithm, and
wherein the first bit string is a random bit string;
wherein the transceiver is further configured to cooperate with the processor to obtain a first result that is determined based on the first bit string and a second bit string, wherein the second bit string is determined based on a part of bits in the original key;
the processor is further configured to obtain the original key based on a private key in the private-public key pair and the ciphertext by using a decapsulation algorithm, determine the second bit string based on the part of bits in the original key, and determine a second result based on the second bit string and the first result;
the transceiver is further configured to cooperate with the processor to send the second result to the second device and receive an opening value, wherein the opening value is sent by the second device to the apparatus in response to the first bit string being the same as the second result, and wherein the opening value is obtained based on the first bit string and the random number by using the commitment algorithm; and the processor is further configured to authenticate the second device based on the opening value and the commitment value, to obtain an authentication result, wherein the authentication result indicates that the apparatus successfully authenticates the second device, and generates a session key used to communicate with the second device.

15. The apparatus according to claim 14, wherein the processor is configured to determine the second bit string and the first result by using a first algorithm, to obtain the second result, wherein the first algorithm is any one or a combination of an exclusive OR operation, a modulo addition operation, a modulo subtraction operation, or a modulo multiplication operation.

16. The apparatus according to claim 14, wherein the processor is further configured to:

delete the private-public key pair after the session key used to communicate with the second device is generated; and re-generate a private-public key pair during an initiation of a key agreement again with the second device or an initiation of a key agreement with a third device.

17. The apparatus according to claim 14, wherein the processor is configured to:

generate the session key used to communicate with the second device, based on one or more of the following parameters: an identifier of the first device, an identifier of the second device, the public key, the ciphertext, the commitment value, the opening value, the original key, or the second result.

18. A key agreement apparatus comprising:

a transceiver configured to cooperate with a processor to receive a public key in a private-public key pair generated by using a key generation algorithm; and the processor configured to select an original key based on the public key by using an encapsulation algorithm, obtain a ciphertext based on the public key and the original key by using the encapsulation algorithm, and obtain a commitment value and an opening value based on a first bit string and a random number by using a commitment algorithm, wherein the first bit string is a random bit string, and wherein the transceiver is further configured to send the ciphertext and the commitment value to a first device;

the processor is further configured to determine a second bit string based on a part of bits in the original key, and determine a first result based on the first bit string and the second bit string;

the transceiver is further configured to cooperate with the processor to receive a second result, wherein the second result is determined based on the second bit string and the first result;

the processor is further configured to, in response to the first bit string being the same as the second result, generate a session key used to communicate with the first device, wherein that the first bit string is the same as the second result indicates that a second device comprising a hardware processor successfully authenticates the first device; and the transceiver is further configured to send the opening value to the first device.

19. The apparatus according to claim 18, wherein the processor is configured to determine the first bit string and the second bit string by using a first algorithm, to obtain the first result, wherein the first algorithm is any one or a combination of an exclusive OR operation, a modulo addition operation, a modulo subtraction operation, or a modulo multiplication operation.

20. The apparatus according to claim 18, wherein the processor is further configured to:

delete the public key after generating the session key used to communicate with the first device; and generate a private-public key pair during an initiation of a key agreement again with the first device or an initiation of a key agreement with a third device.

* * * * *